(12) United States Patent
Takahashi

(10) Patent No.: US 8,295,365 B2
(45) Date of Patent: Oct. 23, 2012

(54) WIRELESS RECEIVER

(75) Inventor: Masafumi Takahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1504 days.

(21) Appl. No.: 11/775,252

(22) Filed: Jul. 10, 2007

(65) Prior Publication Data

US 2008/0165862 A1 Jul. 10, 2008

Related U.S. Application Data

(63) Continuation of application No. PCT/JP2005/014961, filed on Aug. 10, 2005.

(30) Foreign Application Priority Data

Jan. 11, 2005 (JP) .................................. 2005-004239

(51) Int. Cl.
*H04N 7/12* (2006.01)
(52) U.S. Cl. ................................. 375/240.28
(58) Field of Classification Search ............... 375/240.28
See application file for complete search history.

(56) References Cited

U.S. PATENT DOCUMENTS

| 6,397,000 | B1 * | 5/2002 | Hatanaka et al. | 386/327 |
| 6,801,591 | B1 * | 10/2004 | Frencken | 375/373 |
| 2003/0071925 | A1 * | 4/2003 | Kanno et al. | 348/726 |
| 2003/0218693 | A1 * | 11/2003 | Ikeguchi | 348/554 |
| 2004/0062334 | A1 * | 4/2004 | Poon | 375/376 |
| 2004/0109519 | A1 * | 6/2004 | Mizukami et al. | 375/362 |
| 2006/0034337 | A1 * | 2/2006 | Ryu et al. | 370/503 |

FOREIGN PATENT DOCUMENTS

| JP | 7-250051 A | 9/1995 |
| JP | 10-206570 | 8/1998 |
| JP | 2002-9747 A | 1/2002 |
| JP | 2003-249922 A | 9/2003 |
| JP | 2004-128870 A | 4/2004 |

* cited by examiner

*Primary Examiner* — Mehrdad Dastouri
*Assistant Examiner* — Mohammed Rahaman
(74) *Attorney, Agent, or Firm* — Oblon, Spivak, McClelland, Maier & Neustadt, L.L.P.

(57) ABSTRACT

A bitstream analysis circuit, generates a reference clock control data. A reference clock DPLL receives a system clock signal and reference clock control data from the analysis circuit and generates a reference clock signal. The reference clock DPLL comprises a 1/n frequency dividing circuit for frequency-dividing the system clock signal, and a 1/(n+1) frequency dividing circuit for frequency-dividing the system clock signal. A register stores data to set frequency dividing ratios of both frequency dividing circuits. A mixing ratio set register stores data to set a mixing ratio between output clock signals from both frequency dividing circuits and a mixing circuit, and mixes the output clock signals from both frequency dividing circuits at a mixing ratio in response to the data in the mixing ratio setting register.

17 Claims, 4 Drawing Sheets

WIRELESS RECEIVER

CROSS-REFERENCE TO RELATED APPLICATIONS

This is a Continuation Application of PCT Application No. PCT/JP2005/014961, filed Aug. 10, 2005, which was published under PCT Article 21(2) in English.

This application is based upon and claims the benefit of priority from prior Japanese Patent Application No. 2005-004239, filed Jan. 11, 2005, the entire contents of which are incorporated herein by reference.

BACKGROUND OF THE INVENTION

1. Field of the Invention

The invention relates to a wireless receiver and, more specifically, to a wireless receiver required to match a time reference on a reception side with a time reference transmitted from a transmission side.

2. Description of the Related Art

Generally, the moving picture experts group/moving picture image coding experts group (MPEG) standard is known as one of an internationally standardized information source coding systems for compressing/decompressing color moving images. In MPEG, MPEG-2, which applies to a high-quality moving picture such as digital direct broadcasting by satellite and DVD-video, and MPEG-4, which is a moving picture system capable of coding with a low bit rate for utilization in a mobile communication, cellular phone, personal handy-phone system (PHS), and analog telephone network are known. Digital broadcasting such as DBS digital broadcasting and terrestrial digital broadcasting and MPEG-2 transport stream (TS) system corresponding to a TS suitable for digital communication, etc., are known as one of the stream formats of MPEG-2. A general configuration of MPEG-2 TS system is disclosed, for example, in Jpn. Pat. Appln. KOKAI Publication No. 10-206570. MPEG-2 TS system uses a transmission format in which data such as compressed video/audio is divided into TS packet units with a fixed length of prescribed bytes.

A conventional MPEG-2 TS system used for digital television broadcasting uses a voltage-controlled crystal oscillator (VCXO). The VCOX generates a reference clock signal of 27 MHz. The clock signal output from the VCXO is supplied to an NTSC encoder and a phase-locked loop circuit for an audio clock. A conventional phase-locked loop circuit for the audio clock uses an analog circuit to convert the supplied reference clock signal of 27 MHz into a master clock signal to be used for an audio digital-to-analog converter at the time of reproduction of an audio signal.

The master clock signal used at the audio digital-to-analog converter is different in specification thereof, and it has a frequency of 256 times or 284 times as high as the sampling frequency. For example, in the case where the sampling frequency is the normal 48 kHz, if the master clock signal has a frequency 256 times as high as the sampling frequency, the frequency of the master clock signal becomes 12.288 MHz. Frequency accuracy of the master clock signal used at the audio digital-to-analog converter is generally about ±5%. Frequency accuracy of the reference clock signal of 27 MHz used for an NTSC converter is different in specification thereof, and about ±5%. As stated above, the clock signal used in the conventional MPEG-2 TS system requires high frequency accuracy.

In recent years, digital television broadcasting has been planned for mobile equipment. A mobile terminal to receive the digital television broadcasting supplies a reproduced video signal to a display device as it is without converting it into the NTSC standard and can display images. Accordingly, the NTSC encoder is not required and the reference clock signal of 27 MHz with high accuracy to be supplied to the NTSC encoder is also not required. On the other hand, the master clock signal to be supplied to the audio digital-to-analog converter still requires high accuracy. However, if an audio master clock signal is not synchronous with the reference clock signal of 27 kHz, an acquisition failure of data at the audio digital-to-analog converter occurs.

As described above, the mobile terminal of the digital television broadcasting for mobile equipment can eliminate the VCXO for generating the reference clock signal of 27 MHz with high accuracy and reduce cost. However, if the VCOX is eliminated, because of reduction in frequency accuracy of the audio master clock signal, degradation in sound quality such as disturbance of sound occurs and because of non-synchronization of an audio master clock signal with the reference clock signal of 27 kHz, the acquisition failure of the data at the audio digital-to-analog converter also occurs.

BRIEF SUMMARY OF THE INVENTION

According to an aspect of the invention, a wireless receiver is provided, wherein the wireless receiver comprises a bitstream analysis circuit which receives a bitstream signal including audio/video data and time data, receives a reference clock signal, analyzes the bitstream to detect and output the audio/video data and the time data in the bitstream, and outputs reference clock control data on the basis of the time data; and a first digital phase-locked loop circuit which receives a system clock signal and the clock control data and generates the reference clock signal to supply it to the bitstream analysis circuit.

DETAILED DESCRIPTION OF THE INVENTION

Figure 1:
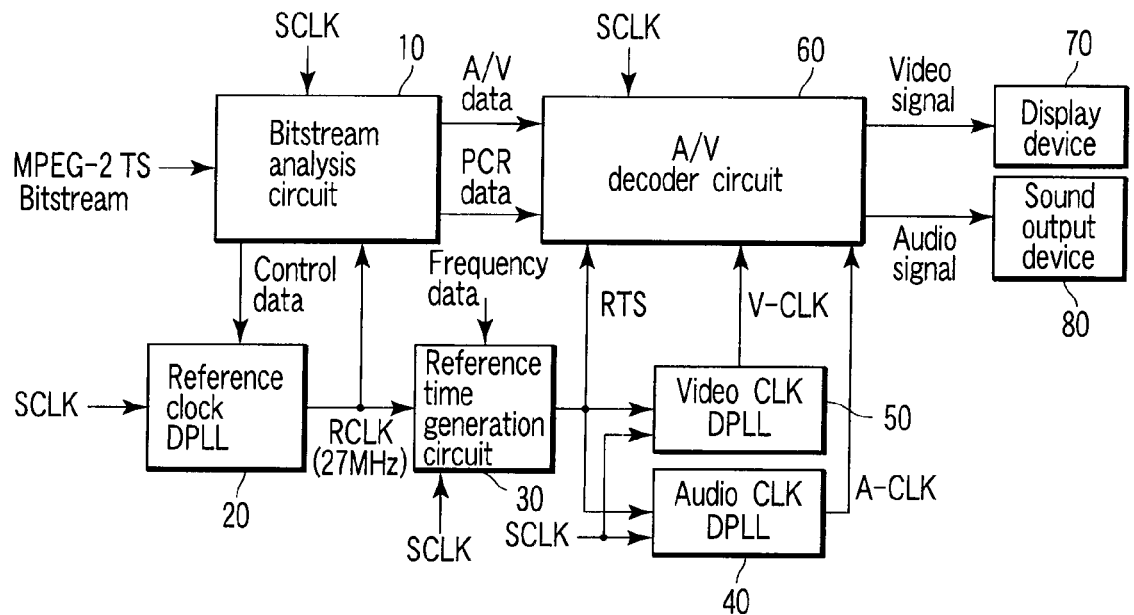
FIG. 1 is a block diagram of a digital broadcasting receiver according to a first embodiment of the present invention.

Hereinafter, embodiments of the present invention will be explained by referring to the drawings. In this explanation, in all the drawings, common parts are designated by common reference symbols.

First Embodiment

FIG. 1 schematically shows a circuit configuration of a digital broadcasting receiver for a mobile terminal according to a first embodiment of a wireless receiver of the present invention. The receiver shown in FIG. 1 includes a bitstream analysis circuit 10, a reference clock digital phase-locked loop circuit (reference clock DPLL) 20, a reference time generation circuit 30, an audio clock digital phase-locked loop circuit (audio CLK DPLL) 40 for generating a video master clock signal to be used as a reference clock signal at the time of audio signal reproduction, a video clock digital phase-locked loop circuit (video CLK DPLL) 50 for generating a video master clock signal to be used as a reference clock signal at the time of video signal reproduction, an audio/video decoder circuit (A/V decoder circuit) 60, a display device 70, and a sound output device 80.

The analysis circuit 10 receives an MPEG-2 TS bitstream included in a digital broadcasting signal, detects and outputs audio/video (A/V) data and time (PCR) data in the bitstream by analyzing the MPEG-2 TS bitstream, and also controls an operation of the reference clock DPLL 20 on the basis of the detected PCR data.

The reference clock DPLL 20 receives a system clock signal SCLK and generates a reference clock signal RCLK, for example, of 27 MHz. The frequency of the reference clock signal RCLK does not always have to set to 27 kHz.

The reference time generation circuit 30 counts the reference clock signal RCLK generated from the reference clock DPLL 20 and generates a reference time signal RTS synchronized with the reference clock signal RCKL at every specified interval, for example, 1 ms.

The system clock signal SCLK and the reference time signal RTS generated from the reference time generation circuit 30 are also supplied to the audio CLK DPLL 40. The audio CLK DPLL 40 synchronizes with the reference time signal RTS and generates an audio master clock signal A-CLK to be used as the reference clock signal at the time of the audio signal reproduction.

The system clock signal SCLK and the reference time signal RTS generated from the reference time generation circuit 30 are also supplied to the video CLK DPLL 50. The video CLK DPLL 50 synchronizes with the reference time signal RTS and generates a video master clock signal V-CLK to be used as a reference signal at the time of the video signal reproduction. The video master clock signal V-CLK is supplied to the A/V decoder circuit 60 together with the audio master clock signal A-CLK. The A/V data output form the bit stream analysis circuit 10 is supplied to the A/V decoder circuit 60. The A/V decoder circuit 60 decodes the A/V data, reproduces and outputs an audio signal and a video signal in synchronization with the audio master clock signal A-CLK and the video master clock signal V-CLK. The video signal is supplied to the display device 70 as it is without converting into the NTSC standard and displayed as an image. The audio signal is supplied to the sound output device 80 including an audio digital-to-analog converter (audio DAC), an amplifier, a loudspeaker, etc. for audio signal reproduction and converted into a sound output. The A/V decoder circuit 60 may adopt not only one corresponding to the MPEG-2 but also others corresponding to the MPEG-4, etc.

The audio master clock signal A-CLK used for the audio DAC in the sound output device 80 differs in specification and has such a frequency of 256 times or 384 times of a sampling frequency. For example, in the case that the sampling frequency is 48 kHz and the frequency of the audio master clock signal A-CLK is 256 times of the sampling frequency, the frequency of the audio master clock signal A-CLK becomes 12.288 MHz. The audio master clock signal A-CLK necessary for the audio DAC requires high frequency accuracy and generally requires about ±5%.

Figure 2:
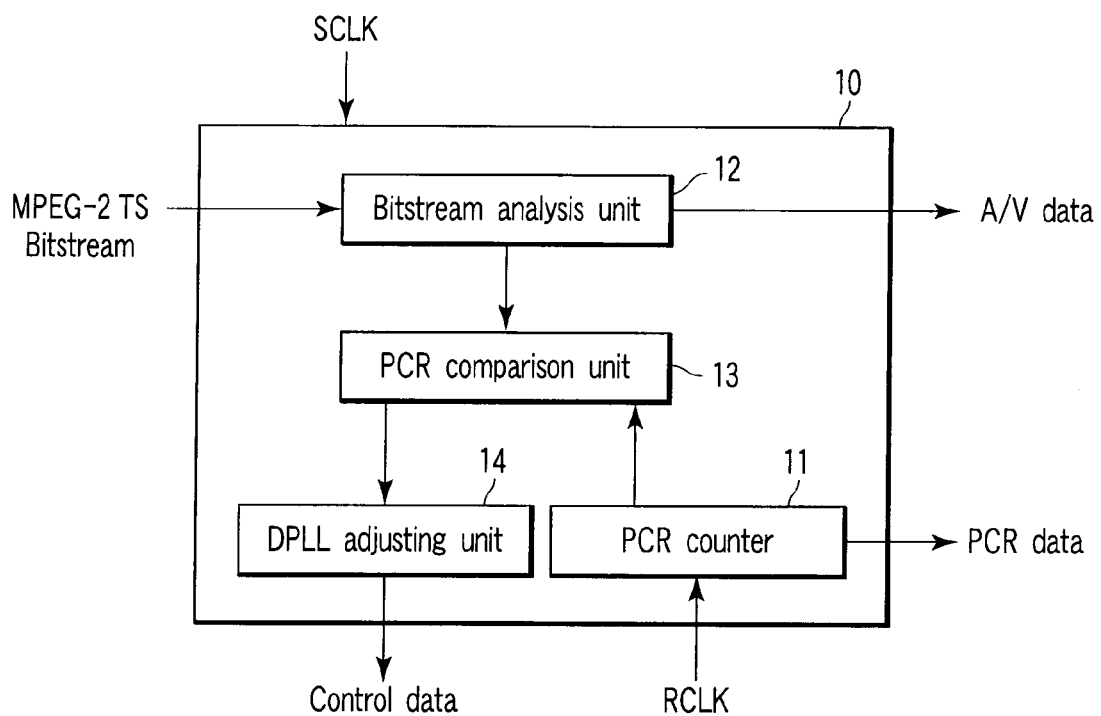
FIG. 2 is a block diagram showing one of an example of a bitstream analysis circuit in FIG. 1.

FIG. 2 shows an example of the bit stream analysis circuit 10 in FIG. 1. The analysis circuit 10 includes PCR counter 11, a bitstream analysis unit 12, a PCR comparison unit 13 and a DPLL adjusting unit 14.

The PCR counter 11 counts the reference clock signal RCLK of 27 MHz supplied from the reference clock DPLL 20 in FIG. 1. The bitstream analysis unit 12 analyzes the MPEG-2 TS bitstream and detects the A/V data in the bitstream and a value of the PCR data (PCR value). The PCR comparison unit 13 compares the PCR value with a value of the PCR counter 11 (PCR counter value). The DPLL adjusting unit 14 outputs control data on the basis of the comparison output from the PCR comparison unit 13 so as to prevent the PCR counter value from being deviated from the PCR value in the bitstream. The control data controls the frequency of the reference clock signal RCLK generated from the reference clock DPLL 20 in FIG. 1. If the PCR value in the bitstream is larger than the PCR counter value, the control data supplied to the reference clock DPLL 20 is set so as to raise the frequency generated from the reference clock DPLL 20. In contrast, if the PCR value in the bitstream is smaller than the PCR counter value, the control data supplied to the reference clock DPLL 20 is set so as to lower the frequency generated from the reference clock DPLL 20.

Figure 3:
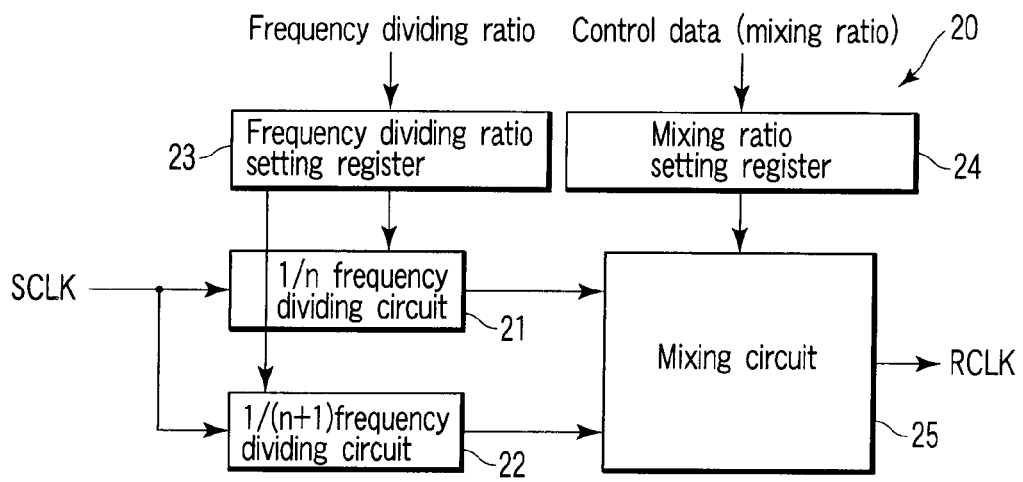
FIG. 3 is a block diagram showing an example of a reference clock digital phase-locked loop circuit in FIG. 1.

FIG. 3 shows an example of the reference clock DPLL 20 in FIG. 1. The reference clock DPLL 20 includes a 1/n frequency dividing circuit 21, a 1/(n+1) frequency dividing circuit 22, a frequency dividing ratio setting register 23, a mixing ratio setting register 24 and a mixing circuit 25.

The 1/n frequency dividing circuit 21 frequency-divides the system clock signal SCLK by n (n is an arbitrary positive integer). The 1/(n+1) frequency dividing circuit 22 frequency-divides the system clock signal SCLK by (n+1). The frequency dividing ratio setting register 23 stores data supplied from a chip inside or outside the chip to set a frequency dividing ratio. The frequency dividing ratio of the 1/n frequency dividing circuit 21 and the 1/(n+1) frequency dividing circuit 22 are respectively set in response to the data in the frequency dividing ratio setting register 23. The mixing ratio setting register 24 stores the control data from the bitstream analysis circuit 10 in FIG. 1 as data to set the mixing ratio between an output clock signal from the 1/n frequency dividing circuit 22 and an output clock signal from the 1/(n+1) frequency dividing circuit 22. The mixing circuit 25 mixes the output clock signal from the 1/n frequency dividing circuit 21 with the output clock signal from the 1/(n+1) frequency dividing circuit 22 at the mixing ratio in response to the data in the mixing ratio setting register 24 and outputs the mixed output clock signals.

Figure 4:
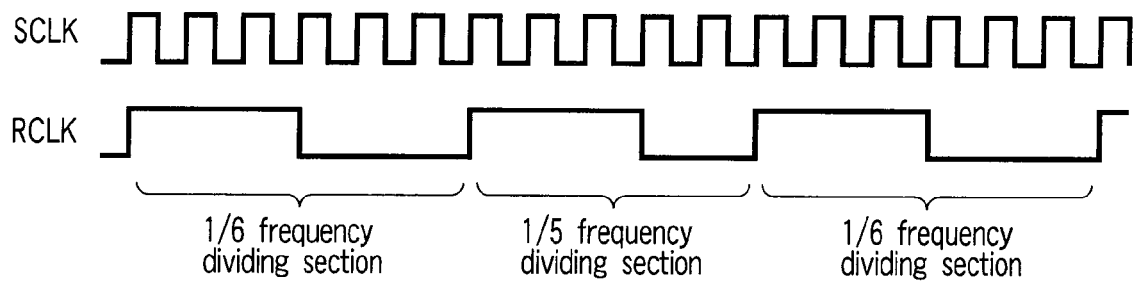
FIG. 4 is a timing chart showing an example of an operation of the phase-locked loop circuit of FIG. 3.

FIG. 4 is the timing chart showing an example of an operation of the reference clock DPLL in FIG. 3. Here, FIG. 4 shows an example of an operation for generating the reference clock signal RCLK of 27 MHz from a system clock signal SCLK of 150 MHz. In this case, the system clock signal SCLK of 150 MHz must be divided by 5.555 . . . , and a reference clock signal RCLK of a frequency close to 27 MHz can be generated by appropriately mixing a signal in which the system clock signal SCLK of 150 MHz is frequency-divided by 5 with a signal in which the system clock signal SCLK of 150 MHz is frequency-divided by 6. For example, if the signal in which the system clock signal SCLK of 150 MHz is frequency-divided by 5 is mixed with the signal in which the system clock signal SCLK of 150 MHz is frequency-divided by 6 at a mixing ratio of fifteen times and twelve times, respectively, the mixing circuit 25 can generate the reference clock signal RCLK of 27 MHz. However, the mixing of two frequency-divided outputs of ⅕ frequency dividing and 1/6 frequency dividing in such a manner increases jitter of the output clock signal from the mixing circuit 25 in comparison with the reference clock signal in the case of use of a VCOX. In the digital broadcasting receiver according to the first embodiment, since the output clock signal from the mixing circuit 25 is not utilized as it is as the audio/video master clock signal, the jitter causes no trouble.

Figure 5:
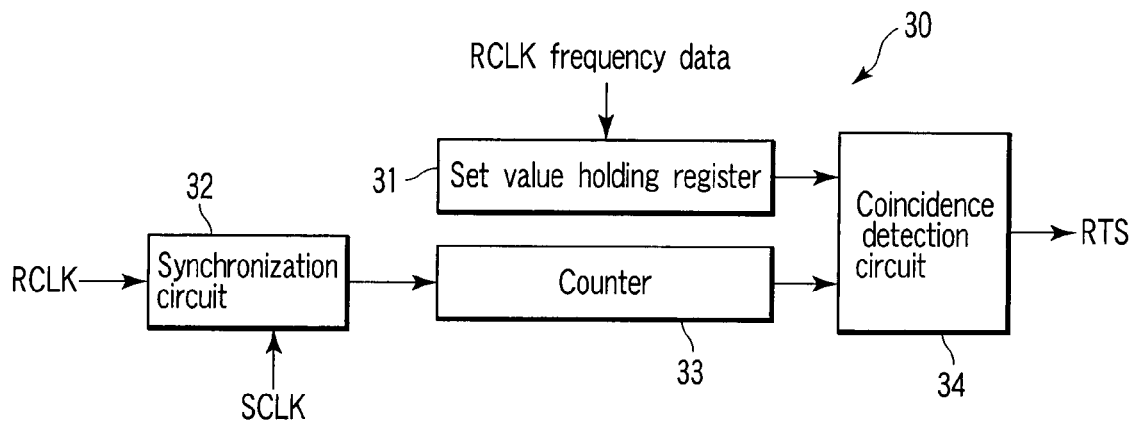
FIG. 5 is a block diagram showing an example of a reference time generation circuit in FIG. 1.

FIG. 5 shows an example of the reference time generation circuit 30 in FIG. 1. The generation circuit 30 includes a setting value holding register 31, a synchronization circuit 32, a counter 33 and a coincidence detection circuit 34.

The holding circuit 31 stores frequency data of the reference clock signal RCLK supplied from the reference clock DPLL 20 in FIG. 1. The synchronization circuit 32 synchronizes the reference clock signal RCLK generated from the reference clock DPLL 20 with the system clock signal SCLK. The counter 33 up-counts the reference clock signal RCLK synchronized by the synchronization circuit 32. The coincidence detection circuit 34 generates a pulse signal when a count value of the counter 33 coincides with data of the holding register 31 and generates the reference time signal RTS.

Figure 6:
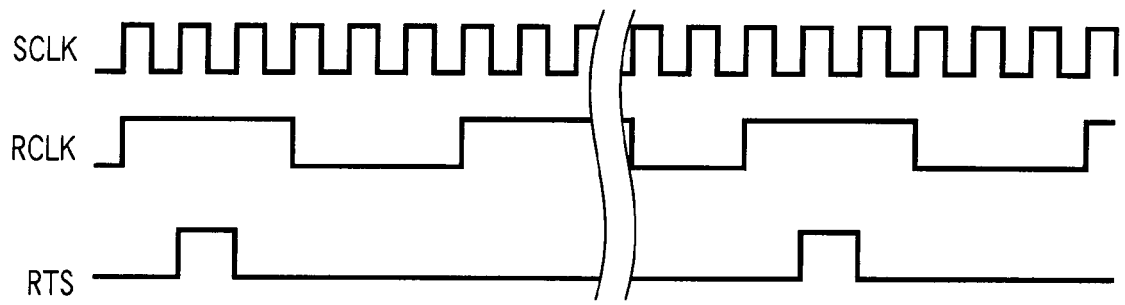
FIG. 6 is a timing chart showing an operation of the reference time generation circuit in FIG. 5.

FIG. 6 is the timing chart showing an example of an operation of reference time generation of the reference time generation circuit 30 in FIG. 5. The reference clock signal RCLK of 27 MHz generated from the reference clock DPLL 20 is synchronized with the system clock signal SCLK. Then, the generation circuit 30 generates the pulse-like reference time signal RTS at every count of 27,000 times of rising edges of the synchronized reference clock signal RCLK. Thus, the generation circuit 30 generates the reference time signal RTS synchronized with the reference clock signal RCLK of 27 MHz every 1 ms. Furthermore, the reference time signal RTS is generated at 1 second by counting of 1,000 times of the reference time signal RTS generated at every 1 ms.

Figure 7:
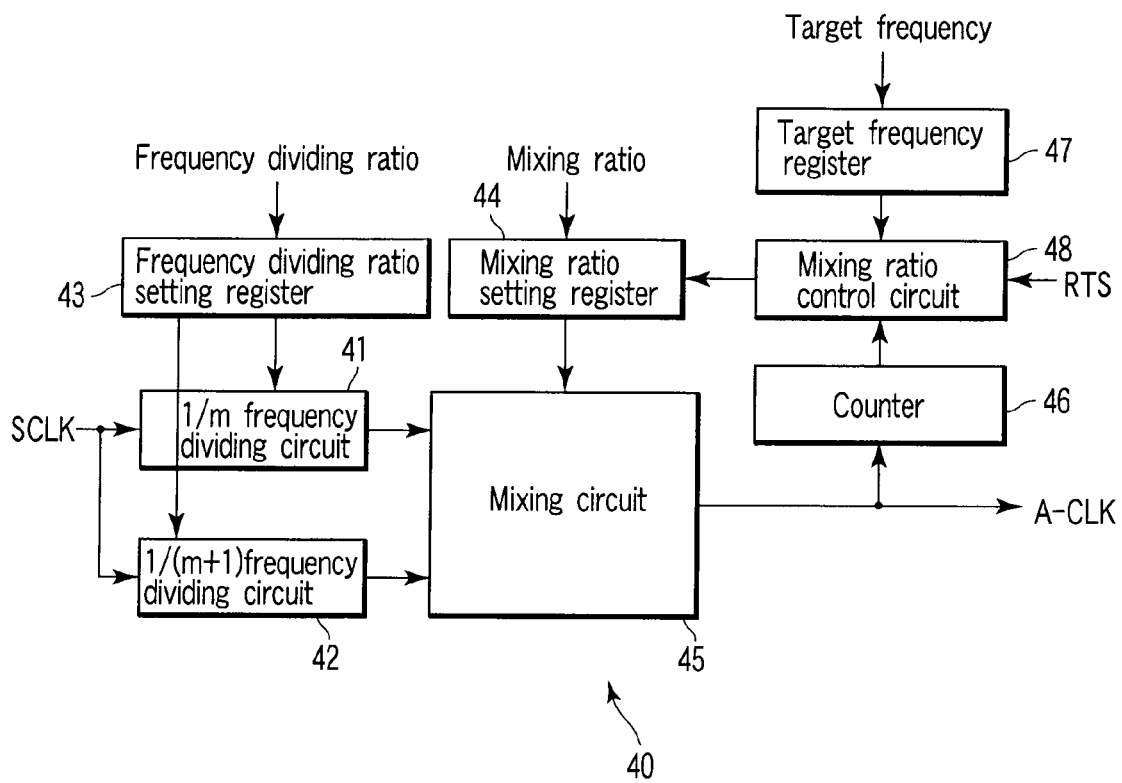
FIG. 7 is a block diagram showing an example of an audio clock digital phase-locked loop circuit in FIG. 1.

FIG. 7 shows an example of the audio CLK DPLL 40 in FIG. 1. The audio CLK DPLL 40 has a structure similar to that of the reference clock DPLL 20 shown in FIG. 3. The audio CLK DPLL 40 includes an 1/m frequency dividing circuit 41, 1/(m+1) frequency dividing circuit 42, a frequency dividing ratio setting register 43, a mixing ratio setting register 44, a mixing circuit 45, a counter 46, a target frequency register 47 and a mixing ratio control circuit 48. The 1/m frequency dividing circuit 41 frequency-divides the system clock signal SCLK by m (m is an arbitrary positive integer). The 1/(m+1) frequency dividing circuit 42 frequency-divides the system clock signal SCLK by (m+1). The frequency dividing ratio setting register 43 stores data supplied from inside or outside the chip to set a frequency dividing ratio. Frequency dividing ratios of the 1/m frequency dividing circuit 31 and the 1/(m+1) frequency dividing circuit 42 are respectively set in response to data in the frequency dividing ratio setting register 43. The mixing ratio setting register 44 stores initial data supplied from inside or outside the chip to set a mixing ratio between an output clock signal from the 1/m frequency dividing circuit 41 and an output clock signal from the 1/(m+1) frequency dividing circuit 42. The mixing circuit 45 generates the audio master clock signal A-CLK by mixing the output clock signal from the 1/m frequency dividing circuit 41 with the output clock signal from the 1/(m+1) frequency dividing circuit 42 at a mixing ratio in response to data in the frequency dividing ratio setting register 44. The counter 46 counts the audio master clock signal A-CLK generated from the mixing circuit 45. The target frequency register 47 stores control data supplied from inside or outside the chip to specify a desired target frequency. The mixing ratio control circuit 48 compares a count value for the reference time signal RTS generated from the reference time signal generation circuit 30 within a specified interval with data in the target frequency register 47, detects whether or not the output clock signal from the mixing circuit 45 has become an accurate frequency and updates data in the mixing ratio setting register 44 according to a detection result.

That is, it is detected whether or not the output clock signal from the mixing circuit 45 has become the accurate frequency by comparing the count value of the counter 46 with the data from the target frequency register 47 at every reference time, for example, at every 1 ms or 1 second by means of the mixing ratio control circuit 48.

In the case that the audio CLK DPLL 40 in FIG. 7 receives the system clock signal SCLK and generates the audio master clock signal A-CLK of, for example, 12.288 MHz, if a cycle of the reference time signal RTS is 1 second, the target frequency register 47 stores data of a value of 12,288,000. Then, if the count value of the counter 46 within a period of one cycle (1 second in this example) of the reference time signal RTS is smaller than 12,288,000, data in the mixing ratio setting register 44 is changed and the mixing circuit 45 is controlled so as to raise the frequency of the output clock signal, i.e., the audio master clock signal A-CLK. In contrast, if the count value of the counter 46 exceeds 12,288,000, the mixing circuit 45 is controlled so as to lower the frequency of the output clock signal.

The video CLK DPLL 50 in FIG. 1 also has a configuration similar to that of the audio CLK DPLL 40 described above. That is, in the case that the video CLK DPLL 50 receives the system clock signal SCLK and generates the video master clock signal of 27 MHz, if the cycle of the reference time signal RTS is 1 second, the target frequency register stores data of a value of 27,000,000. Then, the counter 46 counts the output clock signal from the mixing circuit 45 during the period of one cycle (1 second in this example) of the reference time signal RTS, and if the count value is smaller than 27,000,000, the data in the mixing ratio setting register 44 is changed and the mixing circuit 45 is controlled so as to increase the frequency of the output clock signal, i.e., the video master clock signal V-CLK. In contrast, if the count value exceeds 27,000,000, the mixing circuit 45 is controlled so as to lower the frequency of the output clock signal.

As stated above, since the audio CLK DPLL 40 (video CLK DPLL 50) generates the reference clock signal synchronized with the PCR value in the bitstream, generates the reference time signal RTS synchronized with the reference clock signal and generates the audio master clock signal A-CLK and the video master clock signal V-CLK synchronized with the reference time signal RTS, the audio CLK DPLL 40 (video CLK DPNN) can synchronize the whole of a system.

Consequently, the digital broadcast receiver can eliminate the conventionally required VCXO having high frequency accuracy and reduce the cost. The synchronization between the audio master clock signal A-CLK and the reference clock signal RCLK of 27 MHz can prevent an occurrence of an acquisition failure of data at the audio DAC and an occurrence of a reduction in sound quality such as a disturbance in sound.

The receiver of the first embodiment mentioned above may be achieved not only by hardware but also by software. In the case of use of the software, a main circuit can be structured on a single semiconductor chip on which a processor and a memory with a control program stored therein are mounted. Specifically, the function of the bitstream analysis circuit 10 in FIG. 1 is structured mainly by the processor.

Second Embodiment

In the digital broadcasting receiver of the first embodiment stated above, non-synchronization of an audio signal with the reference clock signal RCLK causes a sound skip and noise. This sound skip and noise can be easily detected by a listener. Therefore, the audio CLK DPLL 40 is synchronized with the reference time signal RTS. Conversely, in the case of a video signal output at 30 or 60 frames per second, a user does not recognize a skip of one frame, so that the non-synchronization does not cause a problem generally. Accordingly, a digital broadcasting receiver of a second embodiment of the present invention generates a video master clock signal V-CLK without synchronizing it with the reference time signal RTS.

Figure 8:
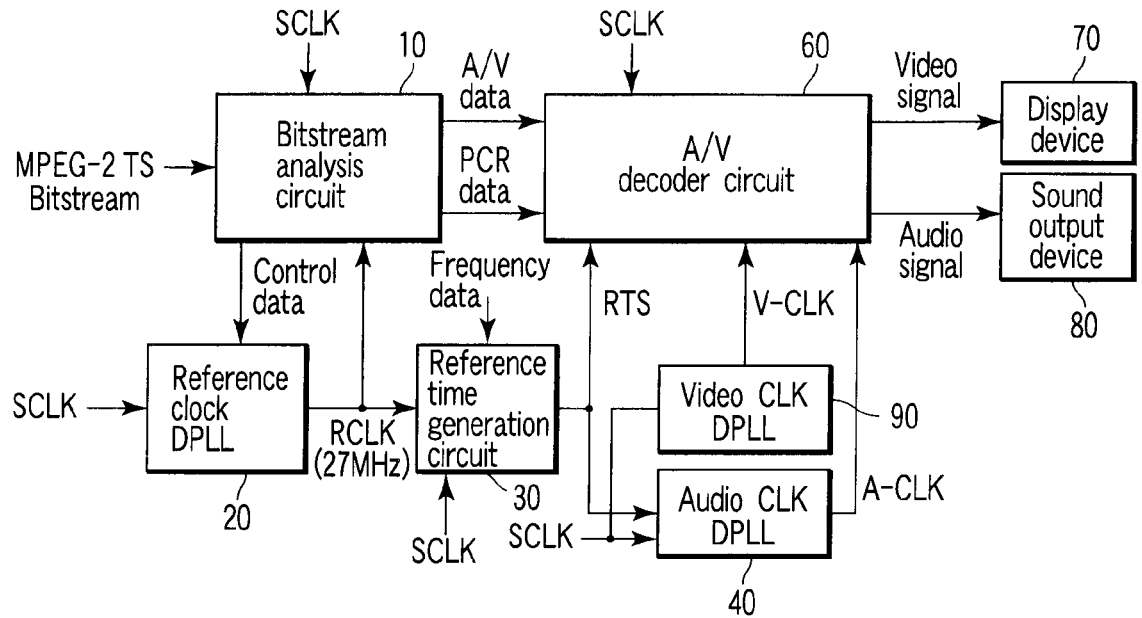
FIG. 8 is a block diagram of a digital broadcasting receiver according to a second embodiment of the present invention.

FIG. 8 schematically shows a circuit configuration of the digital broadcasting receiver according to the second embodiment of the present invention. As mentioned above, the receiver in FIG. 8 differs from that of FIG. 1 in the point that only a system clock signal SCLK is supplied as a clock signal to a video CLK DPLL 90, and does not differ in other points, so that the parts corresponding to those of FIG. 1 are designated by the same reference symbols.

Figure 9:
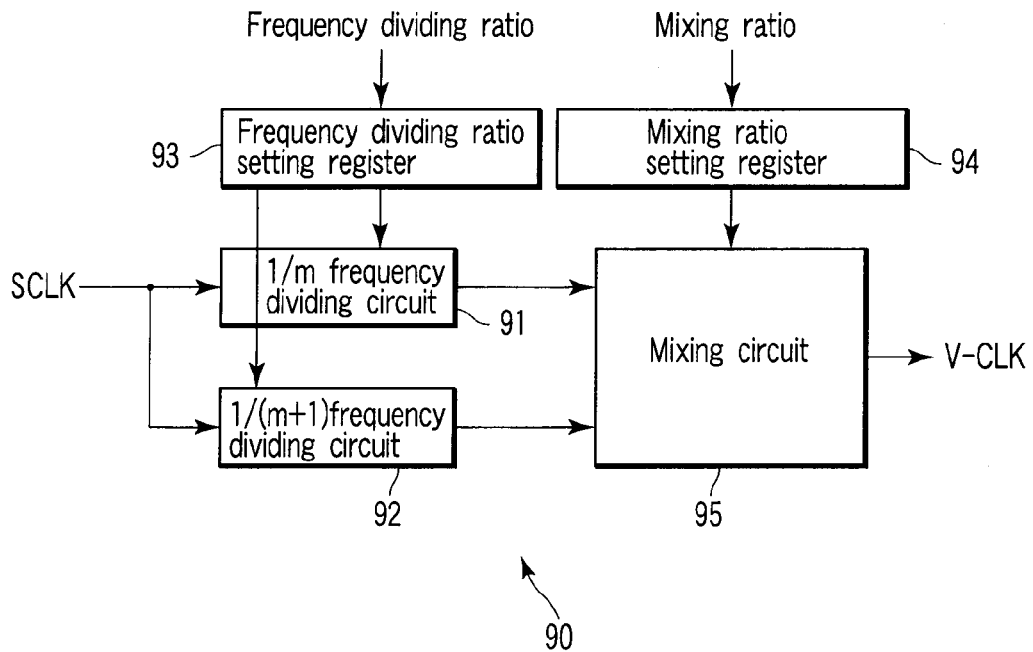
FIG. 9 is a block diagram showing an example of a video clock digital phase-locked loop circuit in FIG. 8.

FIG. 9 shows an example of the video CLK DPLL 90 in FIG. 8. The video CLK DPLL 90 includes a 1/m frequency dividing circuit 91, a 1/(m+1) frequency dividing circuit 92, a frequency dividing ratio setting register 93, a mixing ratio setting register 94 and a mixing circuit 95.

The 1/m frequency dividing circuit 91 frequency-divides the system clock signal SCLK by m. The 1/(m+1) frequency dividing circuit 92 frequency-divides the system clock signal SCLK by (m+1). The frequency dividing ratio setting register 93 stores data supplied from inside or outside the chip for setting a frequency dividing ratio. The frequency dividing ratios of the 1/m frequency dividing circuit 91 and the 1/(m+1) frequency dividing circuit 92 are set, respectively. The mixing ratio setting register 94 stores initial data supplied from inside or outside the chip for setting a mixing ratio between an output clock signal from the 1/m frequency dividing circuit 91 and the 1/(m+1) frequency dividing circuit 92. The mixing circuit 95 mixes the output signal from the 1/m frequency dividing circuit 91 with the output clock signal from the 1/(m+1) frequency dividing circuit 92 at a mixing ratio in response to data in the mixing ratio setting register 94 and generates the video master clock signal V-CLK.

That is to say, the video CLK DPLL 90 shown in FIG. 9 has a configuration substantially similar to that of the reference clock DPLL 20 shown in FIG. 3. Accordingly, the operation of the video CLK DPLL 90 is similar to that of the reference clock DPLL 20.

According to such a configuration, a feedback control system composed of the counter 46, the target frequency register 47 and the frequency dividing ratio control circuit 48 disposed in the audio CLK DPLL 40 shown in FIG. 7 can be eliminated. As a result, the circuit configuration becomes simple, the video CLK DPLL 90 further reduces in cost and becomes suitable for being formed on a semiconductor chip to be used in mobile electronic equipment such as a mobile terminal.

In each embodiment described above, the frequency of the reference clock signal is not limited to 27 MHz. A system differing in frequency of the reference clock signal can be configured in accordance with the desired extent of frequency accuracy of the reference clock signal for a system. For example, a signal with a frequency of 90 kHz of 1/300 of 27 MHz may be used as the reference clock signal. In such a case, the PCR counter in the bitstream analysis circuit 10 counts the signal of 90 kHz and the whole of a system is changed in accordance with the count result. In the reference time generation circuit 30, circuit alterations necessary for generating the reference time signal RTS with a cycle of 1 ms or 1 second from the reference clock signal of 90 MHz are performed. Similarly, the cycle of the reference time signal RTS is not limited to 1 ms or 1 second and may be set to have an arbitrary cycle. In such a case, the system may be configured in response to the cycle of the reference time signal RTS.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless receiver comprising:

a bitstream analysis circuit which receives a bitstream signal including audio/video data and time data, receives a reference clock signal, detects and outputs the audio/video data and the time data in the bitstream by analyzing the bitstream signal, and outputs reference clock control data on the basis of the time data;

a first digital phase-locked loop circuit which receives a system clock signal and the reference clock control data, and generates the reference clock signal to supply it to the bitstream analysis circuit;

a reference time generation circuit connected to the first digital phase-locked loop circuit, the reference time generation circuit receives the reference clock signal to count it and generates a reference time signal synchronized with the reference clock signal at every specified time;

a second digital phase-locked loop circuit which receives the system clock signal and the reference time signal and generates an audio master clock signal to be used at the time of audio signal reproduction in synchronization with the reference time signal;

a third digital phase-locked loop circuit which receives at least the system clock signal and generates a video master clock signal to be used at the time of video signal reproduction; and an audio/video decoder which receives the audio/video data, the audio master clock signal and the video master clock signal and decodes the audio/video data in synchronization with the audio master clock signal and the video master clock signal to output an audio signal and a video signal, wherein the second digital phase-locked loop circuit includes:

a first frequency dividing circuit which receives the system clock signal and divides frequency of the system clock signal by m (m is an arbitrary positive integer);

a second frequency dividing circuit which receives the system clock signal and divides frequency of the system clock signal by (m+1);

a first register connected to the first and the second frequency dividing circuits to set frequency dividing ratios of the first and the second frequency dividing circuits;

a second register which sets a mixing ratio between output clock signals from the first and the second frequency dividing circuits;

a first mixing circuit connected to the first and the second frequency dividing circuits and the second register, the first mixing circuit mixes the output clock signals from the first and the second frequency dividing circuits at a mixing ratio in response to the data in the second register, and outputs a mixed output clock signal;

a first counter which receives and counts the output clock signal from the first mixing circuit;

a third register which stores control data to specify a target frequency; and a first control circuit connected to the second register, the first counter and the third register, the first control circuit receives the reference time signal, compares a count value of the first counter for the reference time signal within a specified interval with the data in the third register, detects whether or not the output clock signal from the first mixing circuit has become an accurate frequency and updates the data in the second register in response to a detection result.

2. The wireless receiver according to claim 1, wherein the first digital phase-locked loop circuit includes:

a third frequency dividing circuit which receives the system clock signal and divides frequency of the system clock signal by n (n is an arbitrary positive integer);

a fourth frequency dividing circuit which receives the system clock signal and divides frequency of the system clock signal by (n+1);

a fourth register connected to the third and the fourth frequency dividing circuits, the fourth register stores data to set frequency dividing ratios of the third and the fourth frequency dividing circuits;

a fifth register which stores data to set a mixing ratio between output clock signals from the third and the fourth frequency dividing circuits; and a second mixing circuit connected to the third and the fourth frequency dividing circuits, the second mixing circuit mixes the output clock signals from the third and the fourth frequency dividing circuits at a mixing ratio in response to the data in the second register to output the mixed output clock signal.

3. The wireless receiver according to claim 1, wherein the third digital phase-locked loop circuit includes:

a third frequency dividing circuit which receives the system clock signal and divides frequency of the system clock signal by m (m is an arbitrary positive integer);

a fourth frequency dividing circuit which receives the system clock signal and divides frequency of the system clock signal by (m+1);

a fourth register connected to the third and the fourth frequency diving circuits to store data for setting frequency dividing ratios of the third and the fourth frequency dividing circuits;

a fifth register which stores data for setting a mixing ratio between output clock signals from the third and the fourth frequency dividing circuits; and a second mixing circuit which receives the output clock signals from the third and the fourth frequency dividing circuits and the data stored in the fifth register and mixes the output clock signals from the third and the fourth frequency dividing circuits at a mixing ratio in response to the data in the fifth register to output the mixed output clock signal.

4. The wireless receiver according to claim 1, wherein the third digital phase-locked loop circuit further receives the reference time signal and generates the video master clock signal in synchronization with the reference time signal.

5. The wireless receiver according to claim 4, wherein the third digital phase-locked loop circuit includes:

a third frequency dividing circuit which receives the system clock signal and divides frequency of the system clock signal by m (m is an arbitrary positive integer);

a fourth frequency dividing circuit which receives the system clock signal and divides frequency of the system clock signal by (m+1);

a fourth register connected to the third and the fourth frequency diving circuits, the fourth register stores data to set frequency dividing ratios of the third and the fourth frequency dividing circuits;

a fifth register which stores data to set a mixing ratio between output clock signals from the third and the fourth frequency dividing circuits;

a second mixing circuit which receives the output clock signals from the third and the fourth frequency dividing circuits and the data stored in the fifth register and mixes the output clock signals from the third and the fourth frequency dividing circuits at a mixing ratio in response to the data in the fifth register to output the mixed output clock signal;

a second counter for receiving the output clock signal from the second mixing circuit and counting the output clock signal;

a sixth register which stores control data to specify a target frequency; and a second control circuit which receives the reference time signal, a count value of the second counter and the data in the sixth register, the second control circuit compares the count value of the second counter for the reference time signal within a specified interval with the data in the sixth register, detects whether or not the output clock signal from the second mixing circuit has become an accurate frequency and updates the data in the fifth register in response to a detection result.

6. The wireless receiver according to claim 1, wherein the reference time generation circuit includes:

a fourth register which stores frequency data of the reference clock signal generated from the first digital phase-locked loop circuit;

a synchronization circuit which receives the system clock signal and the reference clock signal generated from the first digital phase-locked loop circuit and synchronizes the reference clock signal with the system clock signal;

a second counter which receives the reference clock signal synchronized by the synchronization circuit and counts the reference clock signal; and a coincidence detection circuit which receives a count value of the second counter and the data in the fourth register and generates a pulse signal when the count value of the second counter coincides with the data in the fourth register.

7. The wireless receiver according to claim 1, wherein the bitstream analysis circuit and the first digital phase-locked loop circuit are formed on a semiconductor chip used for mobile electronic equipment.

8. A digital broadcasting receiver comprising:

a bitstream analysis circuit which receives an MPEG-2 TS bitstream signal included in a digital broadcasting signal, a reference clock signal, detects and outputs audio/video data and time data in the bitstream by analyzing the received signals and outputs reference clock control data on the basis of the time data;

a first digital phase-locked loop circuit which receives a system clock signal and the reference clock control data and generates the reference clock signal with a prescribed frequency to supply it to the bitstream analysis circuit;

a reference time generation circuit which receives the system clock signal and the reference clock signal, counts the reference clock signal and generates the reference time signal synchronized with the reference clock signal at every specified interval;

a second digital phase-locked loop circuit which receives the system clock signal and the reference time signal and generates an audio master clock signal to be used at the time of audio signal reproduction in synchronization with the reference time signal;

a third digital phase-locked loop circuit which receives at least the system clock signal and generates a video master clock signal to be used at the time of video signal reproduction; and an audio/video decoder which receives audio/video data output from the bitstream analysis circuit, the audio master clock signal and the video master clock signal, decodes the audio/video data and reproduces an audio signal and a video signal in synchronization with the audio master clock signal and the video master clock signal, wherein the first digital phase-locked loop circuit includes:

a first frequency dividing circuit which receives the system clock signal and divides frequency of the system clock signal by n (n is an arbitrary positive integer);

a second frequency dividing circuit which receives the system clock signal and divides frequency of the system clock signal by (n+1);

a first register connected to the first and the second frequency dividing circuits, the first register stores data to set frequency dividing ratios of the first and the second frequency dividing circuits;

a second register which stores data to set a mixing ratio between output clock signals from the first and the second frequency dividing circuits; and a first mixing circuit which receives the output clock signals from the first and the second frequency dividing circuits and mixes the output clock signals from the first and the second frequency dividing circuits at a mixing ratio in response to the data in the second register to output the mixed output clock signal.

9. The digital broadcasting receiver according to claim 8, wherein the second digital phase-locked loop circuit includes:

a third frequency dividing circuit which receives the system clock signal and divides frequency of the system clock signal by m (m is an arbitrary positive integer);

a fourth frequency dividing circuit which receives the system clock signal and divides frequency of the system clock signal by making (m+1);

a third register connected to the third and the fourth frequency dividing circuits, the third register stores data to set frequency dividing ratios of the third and the fourth frequency dividing circuits;

a fourth register which stores data to set a mixing ratio between output clock signals from the third and the fourth frequency dividing circuits; and a second mixing circuit which receives the output clock signals from the third and the fourth frequency dividing circuits and the data stored in the fourth register and mixes the output clock signals from the third and the fourth frequency dividing circuits at a mixing ratio in response to the data in the fourth register to output the mixed output clock signal;

a first counter which receives the output clock signal from the second mixing circuit and counts the output clock signal;

a fifth register which stores control data to specify a target frequency; and a first control circuit which receives the reference time signal, a count value of the first counter and the data in the fifth register, the first control circuit compares the count value of the first counter for the reference time signal within a specified interval with the data in the fifth register, detects whether or not the output clock signal from the second mixing circuit has become an accurate frequency and updates the data in the fourth register in response to a detection result.

10. The digital broadcasting receiver according to claim 8, wherein the third digital phase-locked loop circuit includes:

a third frequency dividing circuit which receives the system clock signal and divides frequency of the system clock signal by m (m is an arbitrary positive integer);

a fourth frequency dividing circuit which receives the system clock signal and divides frequency of the system clock signal by (m+1);

a third register connected to the third and the fourth frequency dividing circuits and stores data to set frequency dividing ratios of the third and the fourth frequency dividing circuits;

a fourth register which stores data to set a mixing ratio between output clock signals from the third and the fourth frequency dividing circuits; and a second mixing circuit which receives the output clock signals from the third and the fourth frequency dividing circuits and the data stored in the fourth register and mixes the output clock signals from the third and the fourth frequency dividing circuits at a mixing ratio in response to the data in the fourth register to output the mixed output clock signal.

11. The digital broadcasting receiver according to claim 8, wherein the third digital phase-locked loop circuit further receives the reference time signal and generates the video master clock signal in synchronization with the reference time signal.

12. The digital broadcasting receiver according to claim 11, wherein the third digital phase-locked loop circuit includes:

a third frequency dividing circuit which receives the system clock signal and divides frequency of the system clock signal by m (m is an arbitrary positive integer);

a fourth frequency dividing circuit which receives the system clock signal and divides frequency of the system clock signal by (m+1);

a third register connected to the third and the fourth frequency diving circuits, the third register stores data to set frequency dividing ratios of the third and the fourth frequency dividing circuits;

a fourth register which stores data to set a mixing ratio between output clock signals from the third and the fourth frequency dividing circuits;

a second mixing circuit which receives the output clock signals from the third and the fourth frequency dividing circuits and the data stored in the fourth register and mixes the output clock signals from the third and the fourth frequency dividing circuits at a mixing ratio in response to the data in the fourth register to output the mixed output clock signal;

a first counter which receives the output clock signal from the second mixing circuit and counts the output clock signal;

a fifth register which stores control data to specify a target frequency; and a first control circuit which receives the reference time signal, a count value of the first counter and the data in the fifth register, the first control circuit compares the count value of the first counter for the reference time signal within a specified interval with the data in the fifth register, detects whether or not the output clock signal from the second mixing circuit has become an accurate frequency and updates the data in the fourth register in response to a detection result.

13. The digital broadcasting receiver according to claim 8, wherein the reference time generation circuit includes:
a third register which stores frequency data of the reference clock signal generated from the first digital phase-locked loop circuit;
a synchronization circuit which receives the system clock signal and the reference clock signal generated from the first digital phase-locked loop circuit and synchronizes the reference clock signal with the system clock signal;
a first counter which receives the reference clock signal synchronized by the synchronization circuit and counts the synchronized reference clock signal; and
a coincidence detection circuit which receives a count value from the first counter and the data in the third register and generates a pulse signal when the count value of the first counter coincides with the data in the third register.

14. The digital broadcasting receiver according to claim 8, wherein the bitstream analysis circuit, the first digital phase-locked loop circuit, the reference time generation circuit, the second digital phase-locked loop circuit, the third digital phase-locked loop circuit and the audio/video decoder are formed on a semiconductor chip to be used for mobile electronic equipment.

15. A portable type digital broadcasting receiver comprising:
a bitstream analysis circuit which receives an MPEG-2 TS bitstream signal included in a digital broadcasting signal, a reference clock signal, detects and outputs audio/video data and time data in the bitstream by analyzing the received signals and outputs reference clock control data on the basis of the time data;
a first digital phase-locked loop circuit which receives a system clock signal and the reference clock control data, the first digital phase-locked loop circuit generates the reference clock signal with a prescribed frequency to supply it to the bitstream analysis circuit;
a reference time generation circuit which receives the system clock signal and the reference clock signal, counts the reference clock signal and generates the reference time signal synchronized with the reference clock signal at every specified time;
a second digital phase-locked loop circuit which receives the system clock signal and the reference time signal and generates an audio master clock signal to be used at the time of audio signal reproduction in synchronization with the reference time signal;
a third digital phase-locked loop circuit which receives the system clock signal and generates a video master clock signal to be used at the time of video signal reproduction; and
an audio/video decoder which receives audio/video data output from the bitstream analysis circuit, the audio master clock signal and the video master clock signal, decodes the audio/video data and reproduces an audio signal and a video signal in synchronization with the audio master clock signal and the video master clock signal;
a display device which receives the video signal reproduced by the audio/video decoder to display images; and
a sound output device which receives the audio signal reproduced by the audio/video decoder to output sounds,
the second digital phase-locked loop circuit includes:
a first frequency dividing circuit which receives the system clock signal and divides frequency of the system clock signal by m (m is an arbitrary positive integer);
a second frequency dividing circuit which receives the system clock signal and divides frequency of the system clock signal by (m+1);
a first register connected to the first and the second frequency dividing circuits, the first register stores data to set frequency dividing ratios of the first and the second frequency dividing circuits;
a second register which stores data to set a mixing ratio between output clock signals from the first and the second frequency dividing circuits;
a first mixing circuit which receives the output clock signals of the first and the second frequency dividing circuits and mixes the output clock signals from the first and the second dividing circuits at a mixing ratio in response to the data in the second register to output the mixed output clock signal;
a first counter which receives and counts the output clock signal from the first mixing circuit;
a third register which stores control data to specify a target frequency; and
a first control circuit which receives the reference time signal output form the reference time generation circuit, a count value of the first counter and the data in the third register, the first control circuit compares the count value of the first counter for the reference time signal within a specified interval with the data in the third register, detects whether or not the output clock signal from the first mixing circuit has become an accurate frequency and updates the data in the second register in response to a detection result.

16. The portable type digital broadcasting receiver according to claim 15, wherein
the first digital phase-locked loop circuit includes:
a third frequency dividing circuit which receives the system clock signal and divides frequency of the system clock signal by n (n is an arbitrary positive integer);
a fourth frequency dividing circuit which receives the system clock signal and divides frequency of the system clock signal by (n+1);
a fourth register connected to the third and the fourth frequency dividing circuits, the fourth register stores data to set frequency dividing ratios of the third and the fourth frequency dividing circuits;
a fifth register which stores data to set a mixing ratio between output clock signals from the third and the fourth frequency dividing circuits; and
a second mixing circuit which receives the output clock signals from the third and the fourth frequency dividing circuits and mixes the output clock signals from the third and the fourth frequency dividing circuits at a mixing ratio in response to the data in the fifth register to output the mixed output clock signal, and
the third digital phase-locked loop circuit includes:
a fifth frequency dividing circuit which receives the system clock signal and divides frequency of the system clock signal by m (m is an arbitrary positive integer);
a sixth frequency dividing circuit which receives the system clock signal and divides frequency of the system clock signal by (m+1);

a sixth register connected to the fifth and the sixth diving circuits which stores data to set frequency dividing ratios of the fifth and the sixth frequency dividing circuits;

a seventh register which stores data to set a mixing ratio between output clock signals from the fifth and the sixth frequency dividing circuits; and a third mixing circuit which receives the output clock signals from the fifth and the sixth frequency dividing circuits and the data in the seventh register and mixes the output clock signals from the fifth and the sixth frequency dividing circuits at a mixing ratio in response to the data in the seventh register to output the mixed output clock signal.

17. The portable type digital broadcasting receiver according to claim 16, wherein the third digital phase-locked loop circuit further comprises:

a second counter which receives and counts the output clock signal from the third mixing circuit;

an eighth register which stores control data to specify a target frequency; and a second control circuit which receives the reference time signal output from the reference time generation circuit, a count value of the second counter and the data in the eighth register, the second control circuit compares the count value of the second counter for the reference time signal within a specified interval with the data in the eighth register, detects whether or not the output clock signal from the third mixing circuit has become an accurate frequency and updates the data in the seventh register in response to a detection result.

\* \* \* \* \*